(12) United States Patent
Yang

(10) Patent No.: US 8,811,902 B2
(45) Date of Patent: Aug. 19, 2014

(54) DATA PROTECTION SYSTEM

(75) Inventor: Ho-Cheng Yang, New Taipei (TW)

(73) Assignee: Hon Hai Precision Industry Co. Ltd., New Taipei (TW)

( * ) Notice: Subject to any disclaimer, the term of this patent is extended or adjusted under 35 U.S.C. 154(b) by 259 days.

(21) Appl. No.: 13/442,938

(22) Filed: Apr. 10, 2012

(65) Prior Publication Data

US 2013/0023212 A1  Jan. 24, 2013

(30) Foreign Application Priority Data

Jul. 22, 2011  (TW) .............................. 100126096 A

(51) Int. Cl.
*H04B 7/00* (2006.01)

(52) U.S. Cl.
USPC ...................................................... 455/41.2

(58) Field of Classification Search
CPC .......................... H04M 1/7253; H04W 84/20
USPC ....................................................... 455/41.2
See application file for complete search history.

(56) References Cited

U.S. PATENT DOCUMENTS

| 7,475,244 | B2 * | 1/2009 | Sugikawa | 713/168 |
| 7,609,406 | B2 * | 10/2009 | Roth et al. | 358/1.15 |
| 8,374,652 | B2 * | 2/2013 | Tzoreff et al. | 455/574 |
| 2010/0120363 | A1 * | 5/2010 | Lin | 455/41.2 |
| 2011/0028093 | A1 * | 2/2011 | Patel et al. | 455/41.2 |
| 2012/0233674 | A1 * | 9/2012 | Gladstone et al. | 726/6 |

FOREIGN PATENT DOCUMENTS

TW    200828128 A    7/2008

* cited by examiner

*Primary Examiner* — April G Gonzales
(74) *Attorney, Agent, or Firm* — Novak Druce Connolly Bove + Quigg LLP

(57) ABSTRACT

A protection system includes a storage device and a portable electronic device. The storage device includes a connecting portion, a memory, a first Bluetooth device, and a controller. The connecting portion, the memory, and the first Bluetooth device are connected to the controller. The memory has a read/write port. The controller controls the read/write port to connect the connecting portion for data transmission. The portable electronic device includes a second Bluetooth device and a verifying module. When the connecting portion is connected to the computer, the first Bluetooth device can send an interrogation signal to the second Bluetooth device, the verifying module of second Bluetooth device can permit reading of data in the memory, and the second Bluetooth device sends a reading-permitted signal to the first Bluetooth device, and the controller connect the read/write port to the connecting portion for data transmission.

13 Claims, 3 Drawing Sheets

DATA PROTECTION SYSTEM

BACKGROUND

1. Technical Field

The present disclosure generally relates to data protection systems, and particularly to a data protection system using Bluetooth devices.

2. Description of the Related Art

A storage device such as a U-disk may be used for storing information. The storage device is small and can be easily carried. However, the storage device may also be lost easily due to its small size. If the storage device is lost an unknown party, the unknown party may obtain the information stored in the storage device by connecting the storage device to a computer. The information stored in the storage device such as trade secrets, private information, and other confidential information may be leaked. Therefore, it is very important to protect the information in the storage devices.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
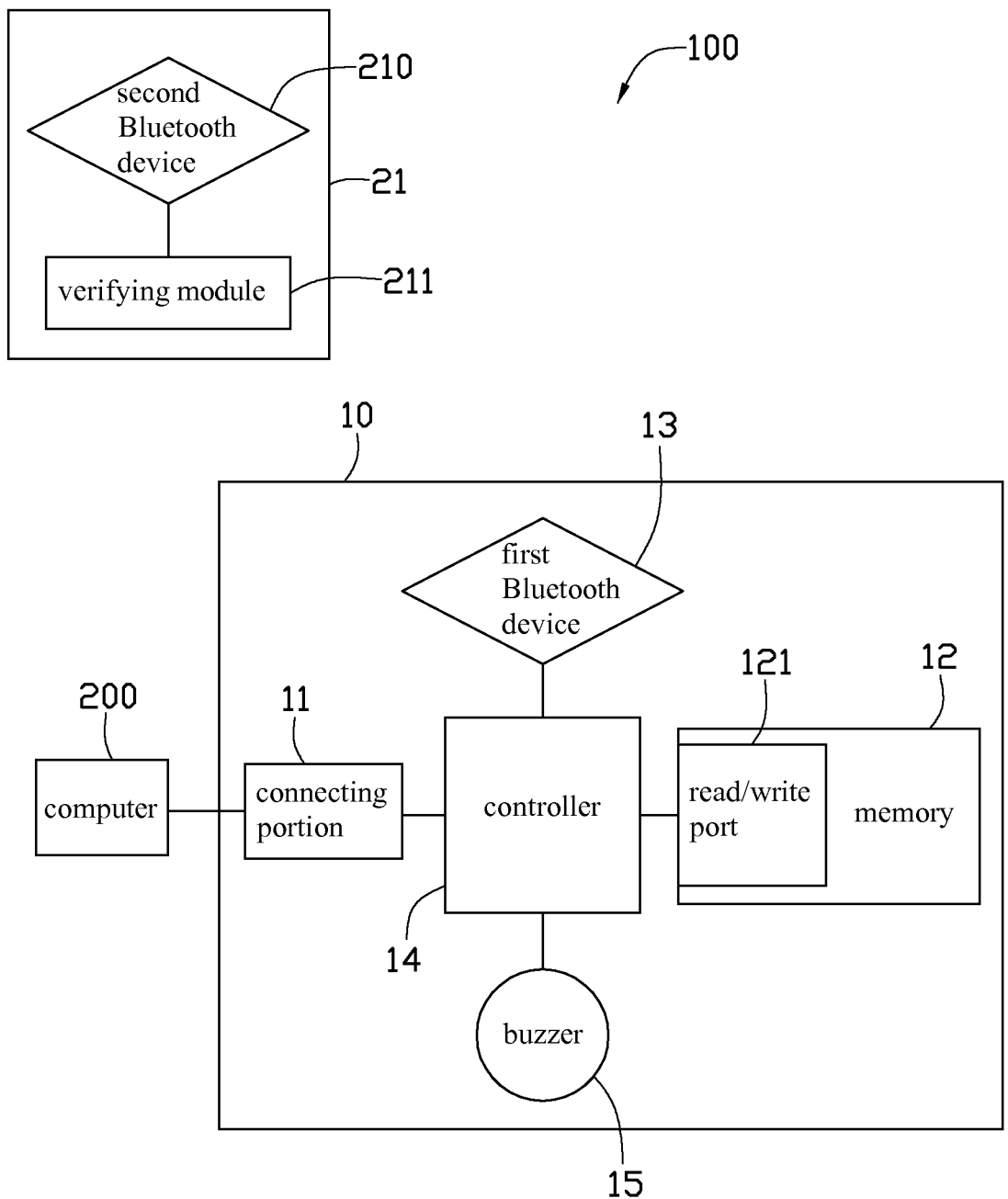
FIG. 1 is a schematic view of an embodiment of a data protection system.

Referring to FIG. 1, an embodiment of a data protection system 100 includes a storage device 10 and a portable electronic device 21. In the illustrated embodiment, the portable electronic device 21 is a mobile phone. The storage device 10 includes a connecting portion 11, a memory 12, a first Bluetooth device 13, and a controller 14. The storage device 10 is connected to a computer 200 via a connecting portion 11. The memory 12 is used for storing data, and includes a read/write port 121. The connecting portion 11, the memory 12, and the first Bluetooth device 13 are all connected to the controller 14. The controller 14 controls the connection/disconnection of the read/write port 121 and the connecting portion 11 for data transmission. The portable electronic device 21 includes a second Bluetooth device 210 and a verifying module 211. When the connecting portion 11 is connected to the computer 200, the first Bluetooth device 13 sends a wireless interrogation signal to the second Bluetooth device 210. If the second Bluetooth device 210 receives the interrogation signal and the verifying module 211 verifies the interrogation signal by inputting a predetermined password in the portable electronic device 21, the second Bluetooth device 210 sends a reading-permitted signal to the first Bluetooth device 13, and then the controller 14 connects the read/write port 121 and the connecting portion 11 for data transmission. The computer 200 can then read data of the memory 12.

If the second Bluetooth device 210 is not turned on or the second Bluetooth device 210 is too far away from the first Bluetooth device 13, the second Bluetooth device 210 cannot receive the interrogation signal from the first Bluetooth device 13, and the first Bluetooth device 13 cannot receive the reading-permitted signal from the second Bluetooth device 210. Therefore, if the storage device 10 is lost and then found by anyone, the data of the storage device 10 cannot be read just by connecting the storage device 10 to the computer 200.

Further, if the second Bluetooth device 210 is in fact turned on and within range, the same inability to read the data will persist, and the reason is described as follows. When the second Bluetooth device 210 receives the interrogation signal from the first Bluetooth device 13, the verifying module 211 cannot be operated by someone who picks up the storage device 10, therefore, the verifying module 211 cannot verify the interrogation signal and the second Bluetooth device 210 would not send the reading-permitted signal to the first Bluetooth device 13. The controller 14 disconnects the read/write port 121 and the connecting portion 11 effectively disabling any data transmission, and thus the computer 200 still cannot read data of the memory 12.

The storage device 10 further includes a buzzer 15. When any data transmission between the read/write port 121 and the connecting portion 11 is completed, the controller 14 activates the buzzer 15 to remind a user to remove the storage device 10 from the computer 200.

The second Bluetooth device 210 and the first Bluetooth device 13 are one-on-one certification. The certification process takes place as follows. When the storage device 10 is first connected to the computer 200, and assuming the second Bluetooth device 210 of the portable electronic device 21 is turned on, the first Bluetooth device 13 starts to search for other Bluetooth devices. When the first Bluetooth device 13 seeks and finds the second Bluetooth device 210, the first Bluetooth device 13 will send a first password as entered in the computer 200 to the second Bluetooth device 210. After the second Bluetooth device 210 receives the first password, the user of the portable device 21 must input a second password in the portable electronic device 21, and the second Bluetooth device 210 sends the second password to the first Bluetooth device 13. When the second password received by the first Bluetooth device 13 matches the first password, the certification process between the first Bluetooth device 13 and the second Bluetooth device 210 is satisfied and completed, and thus the first Bluetooth device 13 can subsequently send the interrogation signal to the second Bluetooth device 210.

Figure 2:
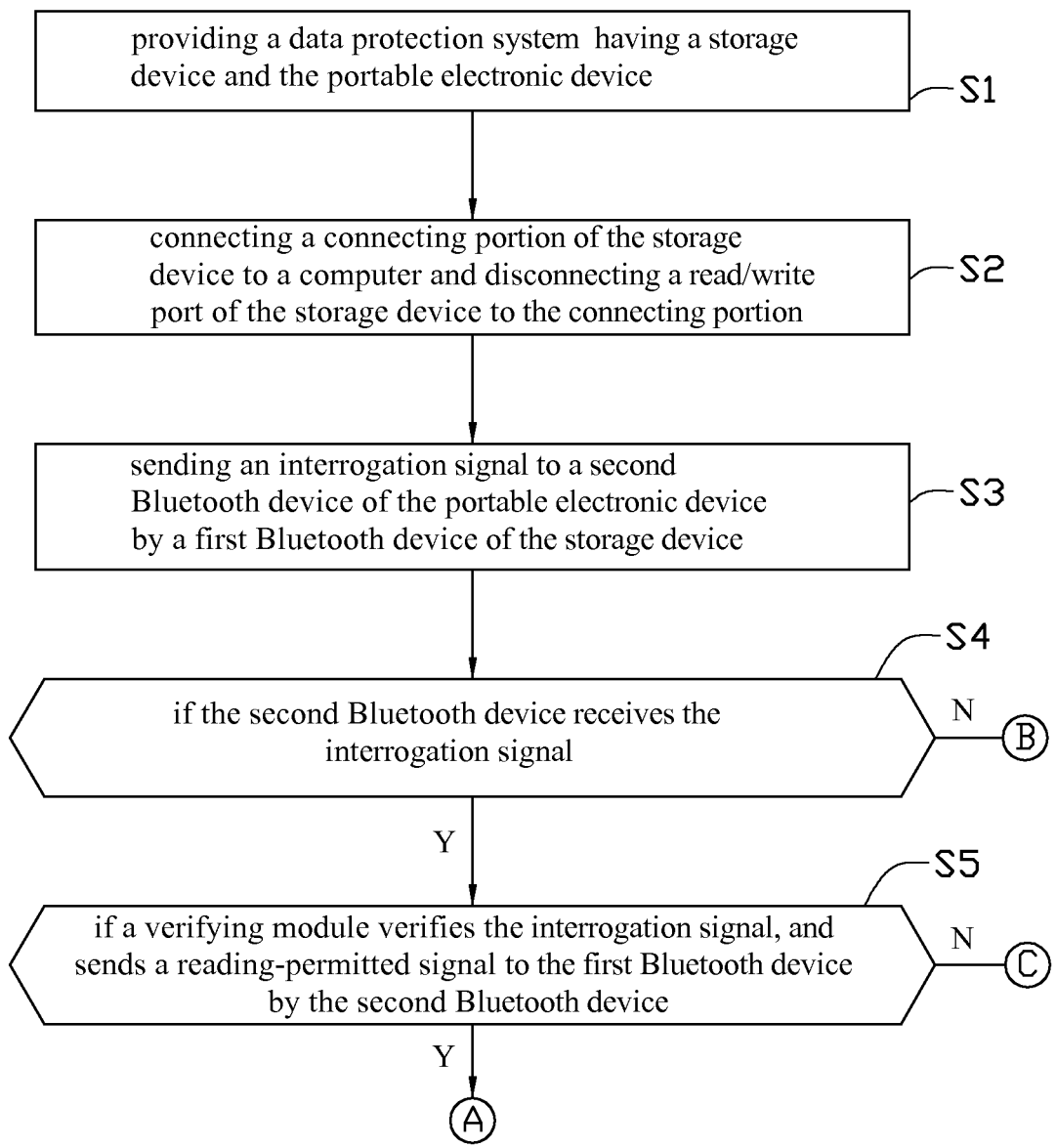
FIGS. 2 and 3 are a single flow chart of an embodiment of a data protection method.
Figure 3:
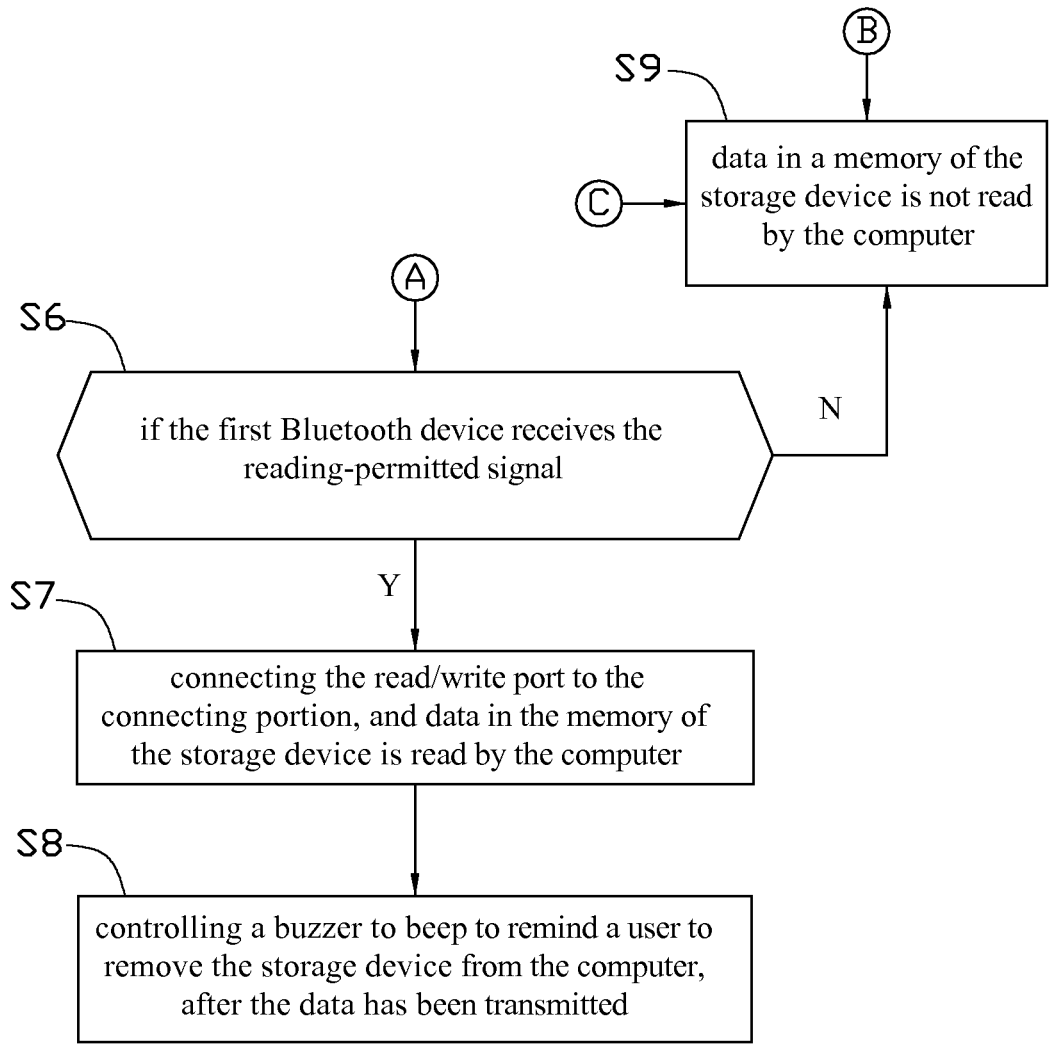

Referring to FIGS. 2 and 3, a data protection method using the data protection system 100 is described as follow. In step S1, the data protection system 100 having the storage device 10 and the portable electronic device 21 is provided. In step S2, the connecting portion 11 of the storage device 10 is connected to the computer 200, and the controller 14 controls the read/write port 121 to disconnect the connecting portion 11 thus preventing the reading of data from the memory 12 by the computer 200. In step S3, the first Bluetooth device 13 sends an interrogation signal to the second Bluetooth device 210, and this state or step is repeated until next step S4 occurs. In step S4, whether the second Bluetooth device 210 receives the interrogation signal. In step S5, the verifying module 211 verifies the interrogation signal by inputting the predetermined password in the portable electronic device 21 and permits reading data in the memory 12, and then the second Bluetooth device 210 sends the reading-permitted signal to the first Bluetooth device 13. In step S6, the first Bluetooth device 13 receives the reading-permitted signal. In step S7, the controller 14 controls the read/write port 121 to connect the connecting portion 11 for data transmission, and thus the computer reads data of the memory 12. In step S8, when the data transmission between the read/write port 121 and the connecting portion 11 is completed, the controller 14 activates the buzzer 15 to beep to remind the user to remove the storage device 10 from the computer 200. In addition, if the second Bluetooth device 210 does not verify the interrogation signal in step S4, or the verifying module 211 does not permit reading data in the memory 12 in step S5, or the first Bluetooth device 13 does not receive the reading-permitted signal in step S6, a step S9 that the computer 200 does not read data of the memory 12 will occur. Between step S1 and step S2, the second Bluetooth device 210 and the first Bluetooth device 13 complete the certification process described above.

When the storage device 10 is lost and connected to the computer 200 by someone unauthorized, the data of the storage device 10 cannot be read in any event if the second Bluetooth device 210 is not turned on, or if the second Bluetooth device 210 is too far away from the first Bluetooth device 13, or if the user does not operate the verifying module 211 of the portable electronic device 21. Therefore, the storage device 10 can protect the data of the storage device 10 in all conceivable situations.

Alternatively, the first Bluetooth device 13 and the second Bluetooth device 210 may be replaced with any devices using a wireless network protocol (such as Bluetooth).

While the present disclosure has been described with reference to particular embodiments, the description is illustrative of the disclosure and is not to be construed as limiting the disclosure. Various modifications can be made to the embodiments by those of ordinary skill in the art without departing from the true spirit and scope of the disclosure, as defined by the appended claims.

What is claimed is:

1. A data protection system, comprising:
    a storage device comprising a connecting portion, a memory, a first Bluetooth device, and a controller, wherein each of the connecting portion, the memory, and the first Bluetooth device is connected to the controller; the memory comprises a read/write port; the controller controls the read/write port to connect the connecting portion for data transmission;
    a portable electronic device comprising a second Bluetooth device and a verifying module;
    wherein the first Bluetooth device is adapted to send an interrogation signal to the second Bluetooth device when the connecting portion is connected to a computer; the verifying module is adapted to permit reading of data in the memory if the second Bluetooth device receives the interrogation signal; the second Bluetooth device is adapted to send a reading-permitted signal to the first Bluetooth device if reading of the data in the memory is permitted; and the controller is adapted to connect the read/write port to the connecting portion to transmit the data to the computer if the first Bluetooth device receives the reading-permitted signal.

2. The data protection system of claim 1, wherein if the second Bluetooth device does not receive the interrogation signal, the controller is adapted to disconnect the read/write port from the connecting portion whereby the computer cannot read the data in the memory.

3. The data protection system of claim 1, wherein if the verifying module does not permit reading the data in the memory, the second Bluetooth device does not send the reading-permitted signal to the first Bluetooth device, and the controller is adapted to disconnect the read/write port from the connecting portion whereby the computer cannot read the data in the memory.

4. The data protection system of claim 1, wherein if the first Bluetooth device does not receive the reading-permitted signal, the controller is adapted to disconnect the read/write port from the connecting portion whereby the computer cannot read the data in the memory.

5. The data protection system of claim 1, wherein the storage device further comprises a buzzer; the controller is adapted to control the buzzer to beep to remind a user to remove the storage device from the computer after the data has been transmitted between the read/write port and the connecting portion.

6. The data protection system of claim 1, wherein the portable electronic device is a mobile phone.

7. An data protection method, comprising:
    providing a data protection system having a storage device and a portable electronic device, wherein the data protection system comprises a connecting portion, a memory, a first Bluetooth device, and a controller, wherein the connecting portion, the memory, and the first Bluetooth device are respectively connected to the controller; the memory has a read/write port; the controller controls the read/write port to connect the connecting portion for data transmission; the portable electronic device comprises a second Bluetooth device and a verifying module;
    connecting the connecting portion to a computer;
    sending an interrogation signal to the second Bluetooth device by the first Bluetooth device;
    receiving the interrogation signal by the second Bluetooth device;
    permitting reading data of the memory by the verifying module, and sending a reading-permitted signal to the first Bluetooth device by the second Bluetooth device;
    receiving the reading-permitted signal by the second Bluetooth device;
    controlling the read/write port to connect the connecting portion by the controller, and reading data of the memory by the computer.

8. The data protection method of claim 7, wherein if the second Bluetooth device does not receive the interrogation signal, the controller is adapted to disconnect the read/write port from the connecting portion whereby the computer cannot read the data in the memory.

9. The data protection method of claim 7, wherein if the verifying module does not permit reading data in the memory, the second Bluetooth device does not send the reading-permitted signal to the first Bluetooth device, and the controller is adapted to disconnect the read/write port from the connecting portion whereby the computer cannot read the data in the memory.

10. The data protection method of claim 7, wherein if the first Bluetooth device does not receive the reading-permitted signal, the controller is adapted to disconnect the read/write port from the connecting portion whereby the computer cannot read the data in the memory.

11. The data protection method of claim 7, wherein the storage device further comprises a buzzer; the controller is adapted to control the buzzer to beep to remind a user to remove the storage device from the computer after the data has been transmitted between the read/write port and the connecting portion.

12. The data protection method of claim 7, wherein the portable electronic device is a mobile phone.

13. The data protection method of claim 7, wherein when the storage device is first connected to the computer, the second Bluetooth device is turned on, and then the first Bluetooth device is adapted to search the second Bluetooth device; the first Bluetooth device is adapted to send a first password entered in the computer to the second Bluetooth device; after the second Bluetooth device receives the first password, the user input a second password in the portable electronic device, and the second Bluetooth device is adapted to send the second password to the first Bluetooth device; if the second password received by the first Bluetooth device is matched with the first password, the certification between the first Bluetooth device and the second Bluetooth device is completed.

* * * * *